United States Patent
Cho

(10) Patent No.: US 7,093,686 B2
(45) Date of Patent: Aug. 22, 2006

(54) CRUISE CONTROL DEVICE FOR VEHICLES

(75) Inventor: Gi-han Cho, Hwasung-shi (KR)

(73) Assignee: Hyundai Mobis, Seoul (KR)

( * ) Notice: Subject to any disclaimer, the term of this patent is extended or adjusted under 35 U.S.C. 154(b) by 295 days.

(21) Appl. No.: 10/682,975

(22) Filed: Oct. 14, 2003

(65) Prior Publication Data

US 2005/0034914 A1 Feb. 17, 2005

(30) Foreign Application Priority Data

Aug. 11, 2003 (KR) ...................... 10-2003-0055387

(51) Int. Cl.
*B60K 31/00* (2006.01)
*B60K 26/00* (2006.01)

(52) U.S. Cl. ...................... 180/315; 180/170

(58) Field of Classification Search ................ 180/170, 180/171, 172, 178, 179, 315; 701/70, 79, 701/93

See application file for complete search history.

(56) References Cited

U.S. PATENT DOCUMENTS

| | | | | |
|---|---|---|---|---|
| 2,978,059 A | * | 4/1961 | Miller | 180/172 |
| 3,373,725 A | * | 3/1968 | Arpaia | 123/406.69 |
| 3,612,017 A | * | 10/1971 | Ishizaki et al. | 123/352 |
| 3,727,714 A | * | 4/1973 | Ishikawa | 180/177 |
| 4,304,202 A | * | 12/1981 | Schofield | 123/363 |
| 4,821,831 A | * | 4/1989 | Onishi | 180/178 |
| 4,972,919 A | | 11/1990 | Ogawa | |
| 5,060,744 A | * | 10/1991 | Katoh et al. | 180/178 |
| 5,161,633 A | * | 11/1992 | Torrielli et al. | 180/170 |
| 5,215,057 A | * | 6/1993 | Sato et al. | 123/400 |
| 5,568,797 A | * | 10/1996 | Landerretche | 123/396 |
| 5,934,400 A | | 8/1999 | Larsen et al. | |
| 6,324,457 B1 | * | 11/2001 | Minowa et al. | 701/70 |
| 6,564,137 B1 | * | 5/2003 | Minowa et al. | 701/70 |

* cited by examiner

*Primary Examiner*—Christopher P. Ellis
*Assistant Examiner*—Bridget Avery
(74) *Attorney, Agent, or Firm*—Greenblum & Bernstein, P.L.C.

(57) ABSTRACT

A cruise control device for vehicles includes a pedal shaft formed at a linking part of an accelerator of the vehicle, a gear rotatably fitted on the pedal shaft, and an adjusting unit releasably engaged with the gear for adjusting the position of an accelerator pedal. The constant speed of the vehicle is quickly and safely maintained in a mechanical manner.

4 Claims, 3 Drawing Sheets

CRUISE CONTROL DEVICE FOR VEHICLES

RELATED APPLICATION

The present disclosure relates to subject matter contained in Korean application No. 2003-55387, filed on Aug. 11, 2003, which is herein expressly incorporated by reference its entirety.

BACKGROUND OF THE INVENTION

1. Field of the Invention

The present invention relates to a cruise control device for vehicles, and more particularly to a cruise control device for vehicles comprising a pedal shaft formed on the link part of an vehicle's accelerator, a gear rotatably fitted on the pedal shaft, and an adjusting unit releasably engaged with the gear for adjusting the position of an accelerator pedal, thereby quickly and safely maintaining the constant speed of the vehicle mechanically.

2. Description of the Related Art

The speed of a vehicle, stemming from the generation of power by means of the combustion stroke of an engine of the vehicle, is generally controlled by means of a brake pedal, a clutch pedal, and an accelerator pedal. The opening angle of a throttle valve, through which mixed gas is supplied to the combustion chamber of the engine, is changed depending on the degree which the accelerator is depressed.

When the accelerator pedal is deeply depressed, the combustion rate of the fuel is increased, thus the vehicle accelerates. On the other hand, when the accelerator pedal is depressed slightly, the combustion rate of fuel is decreased, thus the vehicle decelerates. Consequently, a driver controls the speed of the vehicle via the accelerator pedal.

Although the speed of the vehicle is properly controlled by means of the accelerator pedal on the basis of road conditions, it may be preferable to maintain a constant speed of the vehicle for a desired period of time. In this case, the accelerator pedal must be depressed at a constant level.

In the case where a vehicle is driven at a constant speed, the consumption rate of fuel is reduced, and vehicle components are not overstrained. However, it is difficult, even for a skilled driver, to maintain a constant speed under various conditions.

A cruise control device for vehicles, which is capable of maintaining a constant speed has been developed in order to solve the above-mentioned problems. The cruise control device, which comprises complex mechanical units and complex electronic units, controls the throttle valve to maintain the speed of the vehicle at a predetermined speed.

However, the cruise control device, which controls the throttle valve to maintain the constant speed of the vehicle, has an asynchronous feedback mechanism such that the opening angle of the throttle valve is controlled by means of a driving part, i.e., an actuator, on the basis of the response of a sensor. Consequently, the response speed is very low.

Furthermore, the constant speed of the vehicle is not quickly released in case of an emergency while the vehicle is driven, which may lead to injury of the driver. Also, the durability of the electronic units deteriorates.

SUMMARY OF THE INVENTION

Therefore, the present invention has been made in view of the above problems, and it is an object of the present invention to provide a mechanical cruise control device for vehicles comprising a gear coupled with an accelerator pedal and an adjusting unit for fixing the gear, whereby the durability and response speed of the cruise control device are improved.

In accordance with the present invention, the above and other objects can be accomplished by a cruise control device for vehicles, comprising: a pedal shaft formed on a side of a link part of an accelerator; a gear rotatably fitted on the pedal shaft; and an adjusting unit releasably engaged with the gear for adjusting the position of an accelerator pedal, wherein the adjusting unit comprises: an operation sensor attached to a brake or a clutch for sensing the operation of the brake or the clutch; a controller for receiving a signal from the operation sensor; a length-variable member extended or retracted by means of the signal from the controller; and a latch disposed between the length-variable member and the gear and having a latching protrusion formed at one end thereof, the latch spaced a predetermined distance from the gear by means of a tension spring and moved upward as the length-variable member is extended so that the latching protrusion of the latch engages with the teeth of the gear.

When the accelerator pedal is depressed, the adjusting unit mounted to a vehicle body is engaged with the gear, rotatably fitted on the pedal shaft, whereby the position of the accelerator pedal is fixed so that the vehicle is driven at a constant speed.

The adjusting unit is disengaged from the gear when the brake or the clutch is depressed so that the speed of the vehicle can be controlled manually by the driver.

The cruise control device for vehicles of the present invention maintains the constant speed of the vehicle, not by electronically controlling the throttle valve, but mechanically. Consequently, durability of the parts is improved, and the cruise control device is more stable.

When external pressure, by which the length-variable member is extended so that the latch is moved upward, is no longer applied to the length-variable member, the latch is returned to its original position by means of the restoring force of the spring, and is thus disengaged from the gear. Consequently, the constant speed of the vehicle is quickly discontinued.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be described in detail with reference to the accompanying drawings.

Figure 1:
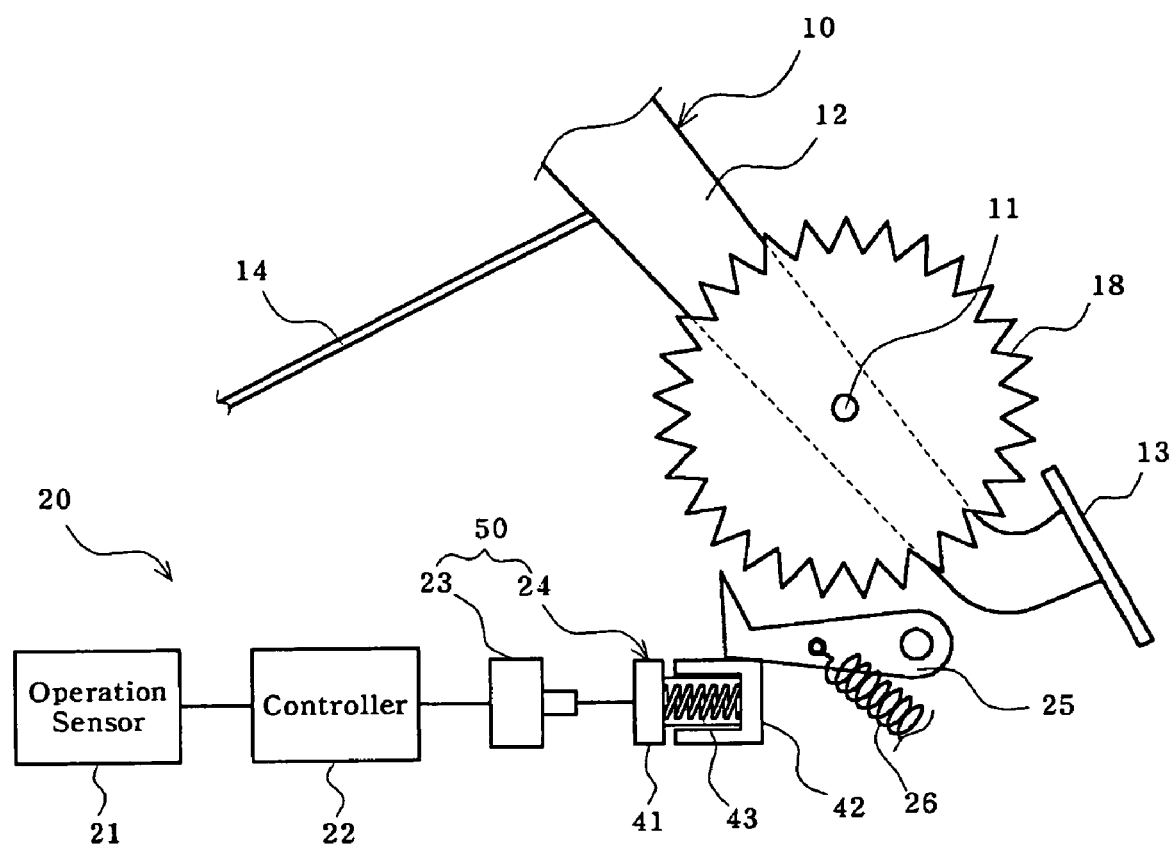
FIG. 1 is a schematic view of a cruise control device for vehicles according to a preferred embodiment of the present invention showing an adjusting unit of the cruise control device for vehicles not engaged with a gear.
Figure 2:
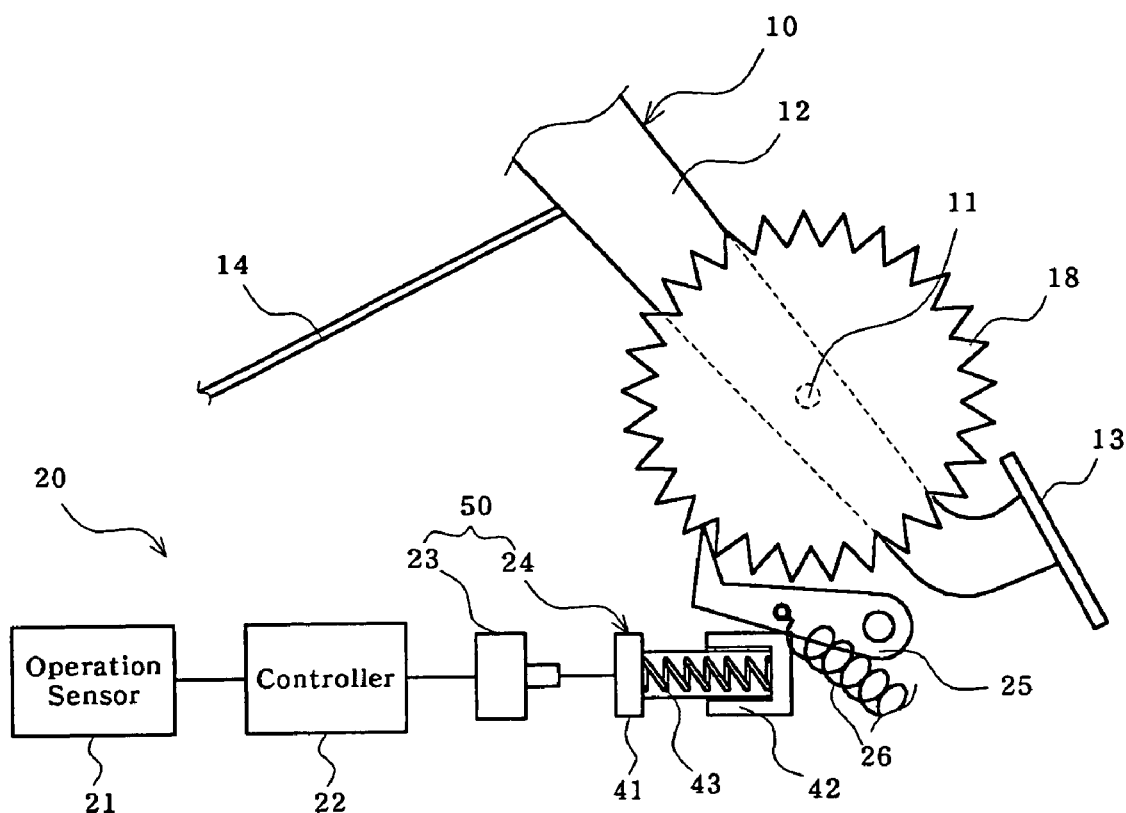
FIG. 2 is a schematic view of the cruise control device for vehicles of the present invention showing the adjusting unit of the cruise control device for vehicles engaged with the gear.

FIG. 1 is a schematic view of a cruise control device for vehicles according to a preferred embodiment of the present invention showing an adjusting unit of the cruise control device for vehicles not engaged with a gear, and FIG. 2 is a schematic view of the cruise control device for vehicles of the present invention showing the adjusting unit of the cruise control device for vehicles engaged with the gear.

As shown in FIGS. 1 and 2, an accelerator 10 adapted according to the present invention is different from a conventional accelerator. On the side of a link 12 of the accelerator 10 is formed a pedal shaft 11. When an accelerator pedal 13 is depressed, the link 12 is rotated clockwise about the pedal shaft 11. As a result, a cable 14 connected to the link 12 is pulled to control the opening angle of a throttle valve (not shown).

On the pedal shaft 11 of the accelerator 10 is rotatably fitted a gear 18. With the gear 18 is releasably engaged an adjusting unit 20. Specifically, the adjusting unit 20 is releasably engaged with the teeth of the gear 18 for adjusting the position of the pedal.

The adjusting unit 20 comprises: an operation sensor 21 attached to a brake (not shown) or a clutch (not shown) for sensing the operation of the brake or the clutch; and a controller 21 for receiving a signal from the operation sensor 21 to control a length-variable member 50, which will be described later.

The length of the length-variable member 50 is changed by means of the signal from the controller 22. The length-variable member 50 comprises a solenoid valve 23, a length-variable bar 24, and a spring 43.

The solenoid valve 23 supplies hydraulic pressure or pneumatic pressure to the length-variable bar 24 by means of a controller 22. When the pressure from the solenoid valve 23 is supplied to the length-variable bar 24, the length-variable bar 24 is extended in a one direction. When the pressure from the solenoid valve 23 is not supplied to the length-variable bar 24, the length-variable bar 24 is returned to its original state by means of the spring 43. As shown in FIGS. 1 and 2, the length-variable bar 24 comprises a first bar 41 and a second bar 42 surrounding the first bar 42. The spring 43 is disposed between the first bar 41 and the second bar 42.

Between the length-variable member 50 and the gear 18 is provided a latch 25. The latch 25 has a protrusion formed at one end thereof. The latch 25 is spaced a predetermined distance from the gear by means of a tension spring 26, one end of which is fixed to a vehicle body. As the length-variable member 50 is extended, the latch 25 is rotated clockwise. As a result, the latching protrusion of the latch 25 is moved upward so that the latching protrusion of the latch 25 is engaged with the teeth of the gear 18.

The teeth of the gear 18 are formed such that they are not engaged with the latch 25 when the gear 18 is rotated clockwise, but they are engaged with the latch 25 only when the gear 18 is rotated counterclockwise. Preferably, the latch 25 is disposed with a predetermined slope or with the side of the latch 25 gradually extending so that the latch 25 can be easily moved upward by means of the length-variable member 50.

Figure 3:
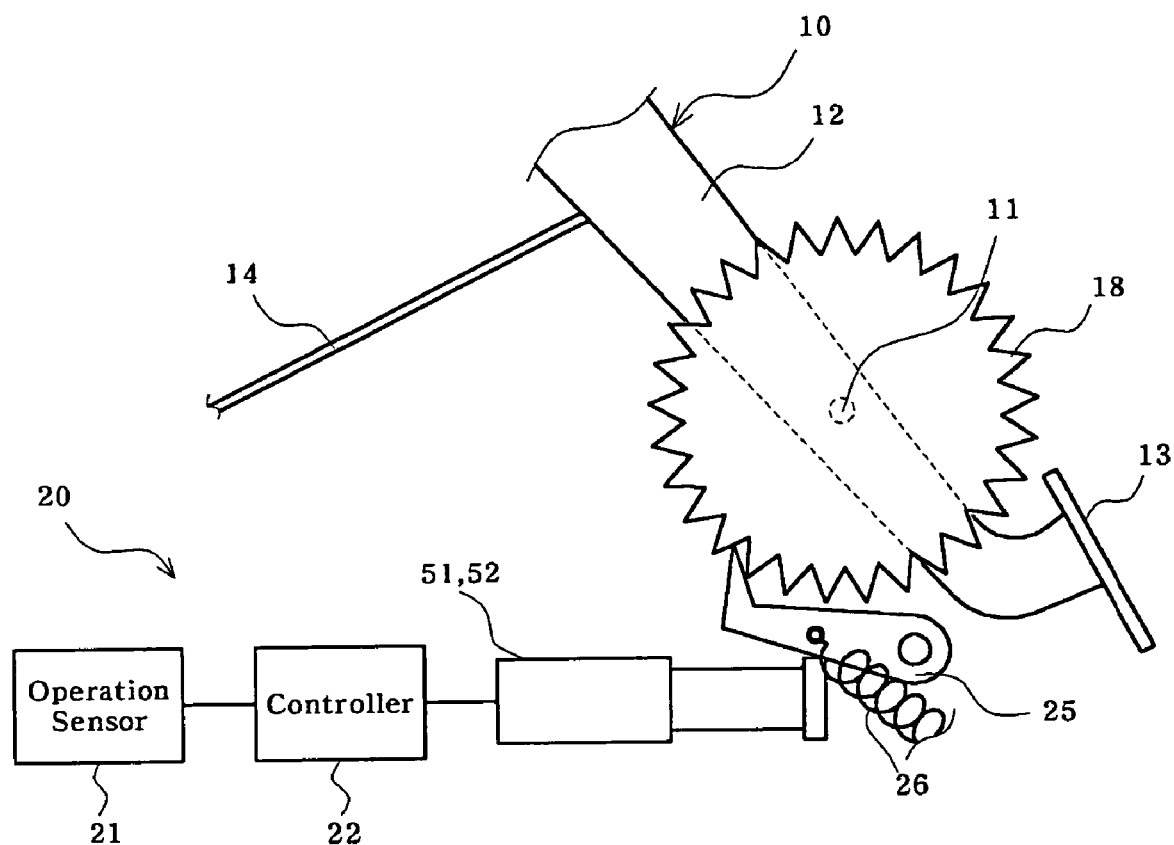
FIG. 3 is a schematic view of a cruise control device for vehicles according to another preferred embodiment of the present invention showing an adjusting unit of the cruise control device for vehicles engaged with a gear.

FIG. 3 is a schematic view of a cruise control device for vehicles according to another preferred embodiment of the present invention showing an adjusting unit of the cruise control device for vehicles engaged with a gear. The length-variable member 50 may be a hydraulic cylinder 51 or a pneumatic cylinder 52, as shown in FIG. 3.

The operation of the cruise control device for vehicles with the above-stated construction according to the present invention will now be described.

When a driver steps on the accelerator pedal 13, the gear 18 is rotated clockwise about the pedal shaft 11. The solenoid valve 23 is opened by means of the controller 22 so that the pressure from the solenoid valve 23 is supplied to the length-variable bar 24.

The length-variable bar 24 is extended by means of the pressure supplied from the solenoid valve 23. As a result, the latch 25 is pushed upward by means of the length-variable bar 24 so that the latching protrusion of the latch 25 is engaged with the teeth of the gear 18 as shown in FIG. 2.

Consequently, the position of the accelerator pedal 13 is fixed even when the driver no longer depresses the accelerator pedal 12. Since the position of the accelerator pedal 12 is fixed, a cable 14 remains constantly pulled, whereby the vehicle can be driven at a constant speed.

Since the latch 25 is engaged with the gear 18 only when the gear 18 is rotated counterclockwise as described above, it is possible to increase the speed of the vehicle by further stepping on the accelerator pedal 13.

The constant speed of the vehicle is released by means of the brake or clutch. The operation sensor 21 is attached to the brake or the clutch. Consequently, a signal from the operation sensor 21 is transmitted to the controller 22 when the brake or the clutch is depressed.

As a result, the pressure from the solenoid valve 23 is no longer supplied to the length-variable bar 24 by means of the controller 22. Preferably, the pressure inside the length-variable bar 24 is released.

As no external pressure is applied to the length-variable bar 24, the length-variable bar 24 is retracted by means of the restoring force of the spring 43. As a result, the latch 25 is no longer pushed upward.

Since no external force is applied to the latch 25, the latch 25 is moved downward by means of the restoring force of the tension spring 26, and is thus disengaged from the teeth of the gear 18.

As described above, the constant speed of the vehicle is quickly released by means of the elastic force of the spring, whereby safe driving is accomplished.

In the case where the hydraulic cylinder 51 or the pneumatic cylinder 52 is used as the length-variable bar 50, the length of the hydraulic cylinder 51 or the pneumatic cylinder 52 is extended by means of the controller 22 to push the latch 25 upward.

As apparent from the above description, the present invention provides a cruise control device for vehicles wherein a latch is moved upward by means of extension of a length-variable member due to a hydraulic pressure or a pneumatic pressure so that the latch is releasably engaged with a gear formed at a side of a link of an accelerator. Consequently, the present invention has the effect of maintaining a constant speed of the vehicle.

The cruise control device for vehicles of the present invention has a simple mechanical structure, and does not require electronic control. Consequently, the cost of parts is reduced and assembly and installation of the cruise control device are simplified.

The present invention also improves durability and operational reliability of the cruise control device since the cruise control device has a mechanical structure.

Furthermore, the constant speed of the vehicle is quickly released by means of an elastic force of a spring, whereby safe driving is guaranteed.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A cruise control device for vehicles, comprising:
   a pedal shaft formed at a side of a link part of an accelerator;
   a gear rotatably fitted on the pedal shaft; and
   an adjuster releasably engaged with the gear to adjust the position of an accelerator pedal,
   wherein the adjuster comprises:
   an operation sensor attached to one of a brake and a clutch to sense operation of the one of the brake and the clutch;
   a controller that receives a signal from the operation sensor;
   a length-variable member extended or retracted by the signal from the controller; and
   a latch disposed between the length-variable member and the gear, the latch having a latching protrusion formed at one end thereof, being spaced a predetermined distance from the gear by a tension spring and configured to move upward as the length-variable member is extended so that the latching protrusion of the latch is engaged with the teeth of the gear.

2. The device as set forth in claim 1, wherein the length-variable member comprises:
   a solenoid valve that supplies pressure by the signal from the controller; and
   a length-variable bar extended in one direction when the pressure from the solenoid valve is supplied to the length-variable bar, the length-variable bar being returned to its original state by a spring disposed therein when the pressure from the solenoid valve is not supplied to the length-variable bar.

3. The device as set forth in claim 1, wherein the length-variable member is a hydraulic cylinder.

4. The device as set forth in claim 1, wherein the length-variable member is a pneumatic cylinder.

* * * * *